United States Patent [19]

Sargoytchev

[11] Patent Number: 5,134,282
[45] Date of Patent: Jul. 28, 1992

[54] OPTOELECTRIC SENSOR AND CONVERTER

[75] Inventor: Stoyan I. Sargoytchev, Plovdiv, Bulgaria

[73] Assignee: Cornell Research Foundation, Inc., Ithaca, N.Y.

[21] Appl. No.: 657,753

[22] Filed: Feb. 20, 1991

[51] Int. Cl.[5] .............................................. G01N 21/00
[52] U.S. Cl. ................................................. 250/227.21
[58] Field of Search ..................... 250/227.21, 227.23, 250/231.1, 551

[56] References Cited

U.S. PATENT DOCUMENTS

| | | |
|---|---|---|
| 3,493,760 | 2/1970 | Hoadley . |
| 3,675,989 | 7/1972 | Pietsch et al. . |
| 4,490,606 | 12/1984 | Lockett et al. ................. 250/227.21 |
| 4,565,924 | 1/1986 | Misumi et al. ....................... 250/551 |
| 4,573,214 | 2/1986 | Mooradian .......................... 455/605 |
| 4,662,003 | 4/1987 | Eichweber .......................... 455/605 |
| 4,695,120 | 9/1987 | Holder .................................. 250/212 |
| 4,742,573 | 5/1988 | Popovic ................................ 455/607 |
| 4,819,273 | 4/1989 | Gordon ................................ 455/605 |
| 4,820,916 | 4/1989 | Patriquin ........................ 250/227.11 |
| 4,929,842 | 5/1990 | ter Hasebrg et al. ............... 250/551 |
| 4,939,793 | 7/1990 | Stewart ................................ 455/605 |

Primary Examiner—Carolyn E. Fields
Attorney, Agent, or Firm—Jones, Tullar & Cooper

[57] ABSTRACT

An LCD is provided for optical communication between a high frequency transducer and monitoring circuitry. The LCD modulates a light signal supplied by the monitor circuitry. The LCD is driven by the combination of two signals, a first signal representative of the parameter sensed by the transducer and a second, reference signal.

5 Claims, 7 Drawing Sheets

OPTOELECTRIC SENSOR AND CONVERTER

BACKGROUND OF THE INVENTION

The present invention relates to opto-electric sensors suitable for measurements in environments in which strict safety requirements exist. In particular, the present invention is suitable for use in fluid level measurements of liquid fuel or temperature measurements. The present invention combines the advantages of high frequency electrical transducers with the advantages of optoelectronic interfacing.

Given strict requirements for electrical insulation or safety, indirect methods of measurement are preferred. For instance, according to the safety guidelines of the International Electrochemical Commission, when taking measurements in a Zone O hazardous environment, such as where explosive gas-air mixtures exist, no electrical equipment should be used, except for specifically certified circuits that are intrinsically safe.

In the past, the following measurement techniques have been utilized: floating mechanical displacement, hydrostatic, ultrasonic, x-ray and fiber optic methods for continuous liquid level measurement; and radiation sensors and fiber optic sensors for temperature measurements.

A disadvantage of the prior art methods has been that the sensors utilized typically have been quite complicated and expensive. Another disadvantage is that the accuracy of these methods is lower than the accuracy of some purely electrical methods. Unfortunately, these electrical methods typically don't meet the strict safety requirements as discussed above. For example, high frequency capacitive transducers are, in principle, quite accurate, but such prior art transducers typically have direct electrical connections to the gauging or monitoring systems and direct electrical connections to an external battery or to a sensor resident watch type battery, either of which negates use of the sensor in hazardous environments.

SUMMARY OF THE INVENTION

It is an object of the present invention to overcome the disadvantages of the prior art sensor devices with regard to their ability to meet the requirements of use in explosive environments.

It is another object of the present invention to provide a sensor in which a highly accurate high frequency electrical transducer may be remotely interfaced with gauging or monitoring apparatus via optical methods.

It is another object of the present invention to provide a sensor of the type requiring low power consumption.

The present invention provides an optoelectric sensor and converter in which the electrical output of a sensitive high frequency transducer may be converted to optical data by using a radiation modulating element, preferably an LCD.

The present invention may be characterized as an optoelectonic sensor and converter, usable in situations which entail strict requirements for electrical isolation, such as when reliable electrical insulation between the measurement area and the electrical gauging system is required.

The present invention generally includes a high frequency transducer, a frequency divider, a reference signal generator, a photocell and a radiation modulating device. The high frequency transducer generates a signal in response to the parameter of interest, i.e. temperature or fluid level. This high frequency signal is passed through the frequency divider circuit which outputs a signal of lesser frequency. The output of the frequency divider and a constant, periodic signal output of the reference signal generator serve as inputs to the radiation modulating device, driving the device such that it reflects or transmits light in a varying manner. The reflected or transmitted light serves as a signal which is representative of the parameter of interest.

More particularly, the sensor unit is made up of a transducer, first and second frequency dividers, a frequency stabilized generator, and a sensor interface. The sensor interface is comprised of a photocell matrix and an LCD. Light from a light source, via a fiber optic link, illuminates the interface components. The photocell, in response to the illuminating light, provides power to the sensor unit components. In addition, a portion of the illuminating light is reflected by the LCD and carried back to the gauging system by another fiber optic cable. The LCD modulates the reflected light in response to the parameter of interest, as sensed by the sensor unit transducer. This separation of sensor unit and gauging unit by the fiber optic cable ensures a high degree of compliance with strict isolation standards.

The transducer located at the sensor unit generates a variable high frequency signal in response to the parameter to be measured, for example temperature or fluid level. Transducers operating at high frequency are preferred, ensuring a high degree of measurement accuracy. A frequency stabilized generator generates a constant high frequency signal which serves as a frequency reference. The frequency dividers proportionally lower the generated signal frequencies to a level at which the LCD is able to operate, frequencies which allow the LCD to operate up to and over it's cutoff drive frequency range.

The drive frequency characteristic is one of the principle parameters for many types of radiation modulated devices including LCD. As is known in the art, the operation up and over cut-off drive frequency range normally is not used because of undesirable effects. However, in the present invention, those previously undesirable effects are used to benefit in that the optical modulation of the LCD is due to the spectrum change that the signal driving the LCD undergoes during one period of frequency difference between the first harmonics of the two applied signals used to derive the LCD drive signal.

BRIEF DESCRIPTION OF THE DRAWINGS

The foregoing, and additional objects, features and advantages of the present invention will become apparent to those of skill in the art from the following detailed description of preferred embodiments thereof, taken in conjunction with the accompanying drawings, in which.

DESCRIPTION OF THE PREFERRED EMBODIMENTS

Figure 1:
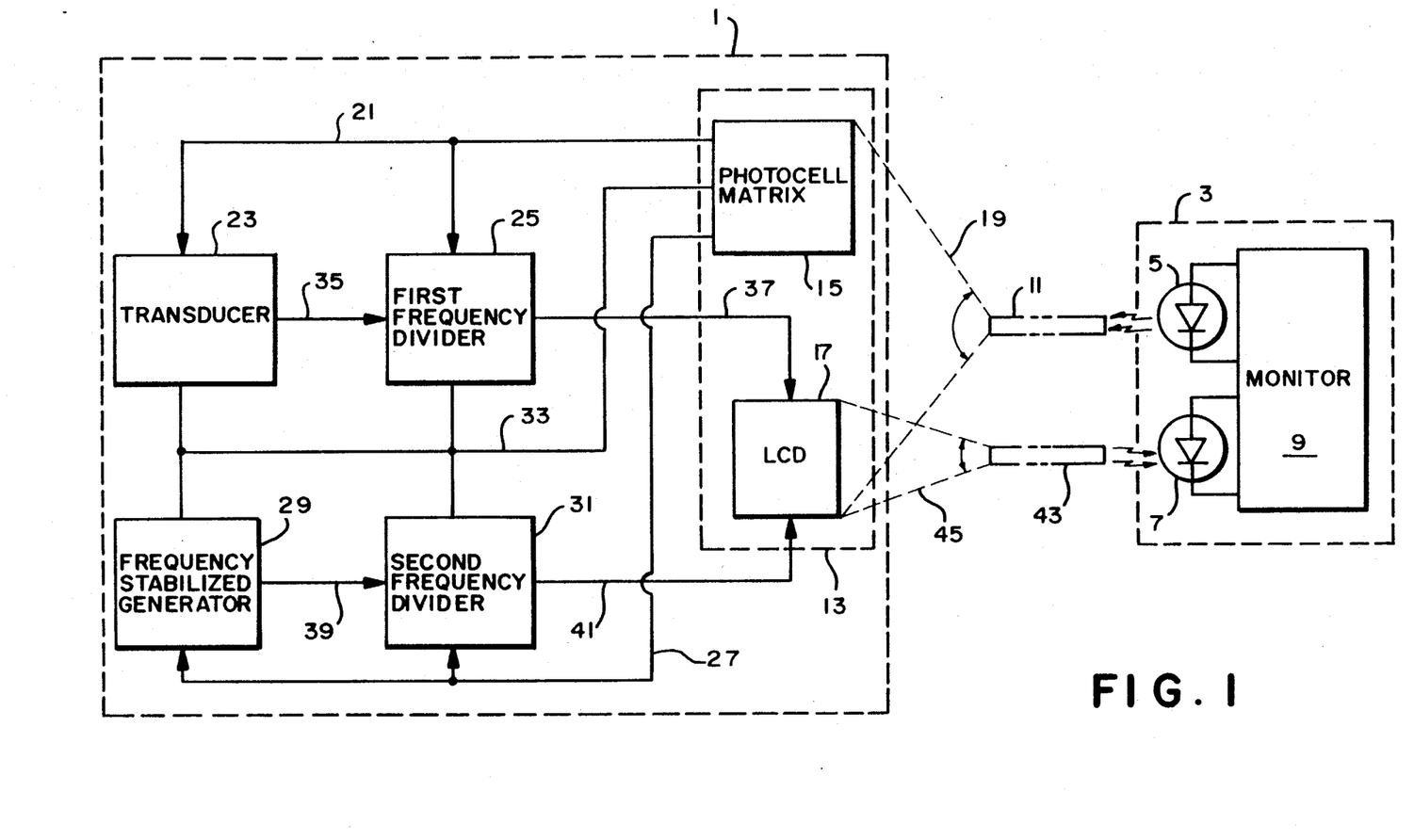
FIG. 1 illustrates an overall block diagram of the optoelectrical sensor and convertor.
Figure 2A:
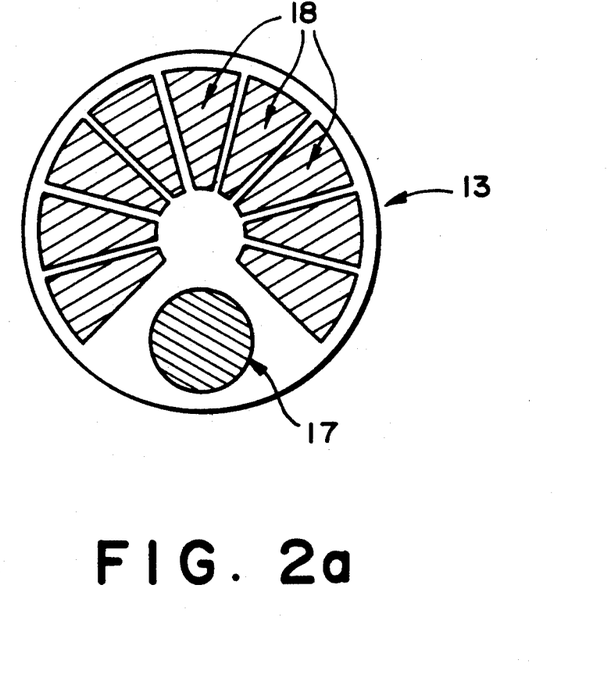
FIGS. 2a and 2b illustrate top views of different embodiments of the sensor interface.
Figure 2B:
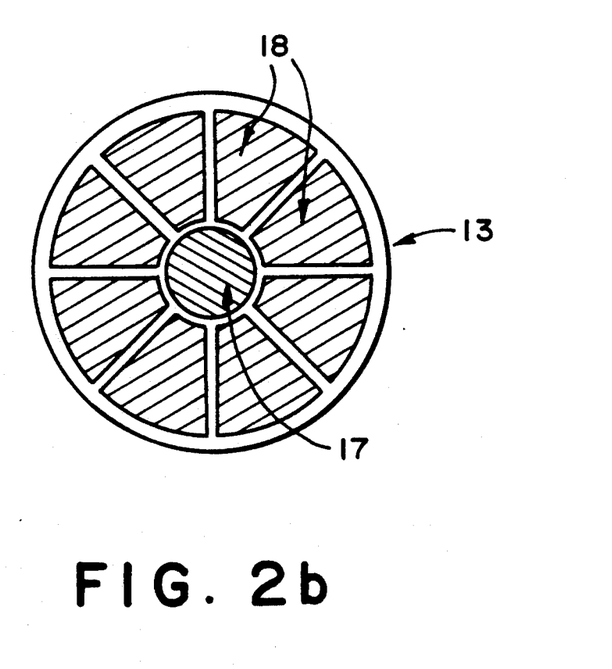

FIG. 1 shows a block diagram of the preferred form of the present invention including a sensor system 1 and a gauging system 3. The gauging system 3 includes a light source 5, a photoreceptor 7 and monitor circuitry 9. The light from the light source 5 is carried via an input fiber optic cable 11 to the sensor system 1, where it illuminates an interface 13 comprised of a photocell matrix 15 and an LCD 17. FIGS. 2a and 2b illustrate various representative configurations of the interface 13 including the LCD 17 and a plurality of individual photocells 18 comprising the photocell matrix 15.

The light leaving the input fiber optic 11, as shown generally at 19 in FIG. 1 is used by the photocell matrix 15 to power the sensor system circuitry. This energy conversion performed by the photocell matrix 15 is a well known process. In addition, part of this light 19 is also reflected by the LCD 17 in a manner to be described later.

The individual photocells 18 comprising the photocell matrix 15 are serially configured such that the photocell matrix 15 outputs voltages of two different polarities with respect to a common ground. Voltage of a first polarity, U+, is supplied via a signal line 21 to power a transducer 23 and a first frequency divider 25. Voltage of a second polarity, U−, is supplied via a signal line 27 to power a frequency stabilized generator 29 and a second frequency divider 31. A common signal line 33 connects the photocell matrix 15, transducer 23, first frequency divider 25, frequency stabilized generator 29 and the second frequency divider 31.

The preferred type of transducer 23 is one which outputs a high frequency signal. In addition, the transducer 23 should consume very low power since the photocell matrix 15 can supply only limited current. For example, capacitive transducers realized in CMOS could be used for direct measurements of fluid level or for detection of mechanical displacement. For temperature measurements, a quartz generator based on "Y-cut" quartz crystal realized in CMOS could be used for the transducer. Such transducers, including their operation, are known in the prior art.

The output of the transducer 23 is a high frequency signal f1, varying in frequency in response to the parameter of interest, and supplied along a signal line 35 to the first frequency divider 25. The first frequency divider 25 outputs a signal f2 which is a mirror image of the high frequency signal f1, although diminished in frequency, along a signal line 37 to a first pole of LCD 17. The frequency stabilized generator 29 outputs a stable, high frequency reference signal f3 along a signal line 39 to the second frequency divider 31. The second frequency divider 31 outputs a signal f4 which is a mirror image of the frequency stabilized generator signal, diminished in frequency relative to f3's frequency, along a signal line 41 to a second pole of LCD 17.

The frequency dividers 25 and 31 serve an important function in that they transform the comparative high frequencies output from the transducer 23 and stabilized frequency generator 29 to the lower relative frequencies required to operate the LCD 17. In addition, frequency dividers 25 and 31 produce signals with symmetrical waveforms and help to reduce any interference developed by the high frequency transducer and frequency stabilized generator, interference which may adversely affect LCD 17.

The signals f2 and f4 drive the LCD 17 in such a manner as to alter the LCD's reflectivity. The light 19 illuminating the LCD 17 is reflected by LCD 17 and carried via an output fiber optic 43 to a photoreceptor 7. The reflected light, shown generally at 45 is modulated by the LCD 17 and serves as a signal indicative of the parameter of interest as sensed by the transducer 23. Monitor circuit 9 then interprets the modulated signal as sensed by photoreceptor 7. Such monitor circuitry can be any well known apparatus to interface photoreceptor outputs and can include suitable gauging circuitry. Again, it should be noted that the components are preferably CMOS devices which require little power. Also, such devices to perform each of the components as illustrated in FIG. 1 are known in the prior art.

Given the manner in which the photocell matrix 15 supplies power to the system components, i.e. a first polarity voltage U+ driving the transducer 23 and the first frequency divider 25 and an opposite polarity voltage U− driving the frequency stabilized generator 29 and the second frequency divider 31, the outputs of the frequency dividers 25 and 31 will drive the LCD 17 in a manner such that the actual signal driving LCD 17 is the resultant of the algebraic sum of the amplitudes of the frequency divider output signals f2 and f4.

The optical polarization of LCD 17, i.e. the molecular orientation of the LCD caused by an externally applied electrical field, and hence it's reflectivity and subsequently the reflected signal, will pulsate with a frequency that depends on the frequency of the transducer 23 output, given that the following conditions are met:

$$f_D \approx f_C$$

$$f_D = f_1/n_3 - f_2/n_4$$

$$\Delta f_D = |\Delta f_1/n_3 - \Delta f_2/n_4| < f_{pmax}$$

where
  $f_D$ is the drive frequency of the LCD 17;
  $f_C$ is the cut-off drive frequency of the LCD 17;
  $f_1$ is the output frequency of the transducer 23;
  $\Delta f_1$ is the frequency deviation of the output frequency signal of the transducer 23;
  $f_2$ is the output frequency of the frequency stabilized generator 29;
  $\Delta f_2$ is the frequency deviation of the frequency stabilized generator 29;
  $n_3$, $n_4$ are the divider coefficients for the first and second frequency dividers 25 and 31, respectively;
  $f_{pmax}$ is the maximum value of polarization frequency of the LCD in which it is still possible to detect the change of it's reflectance.

Figure 3A:
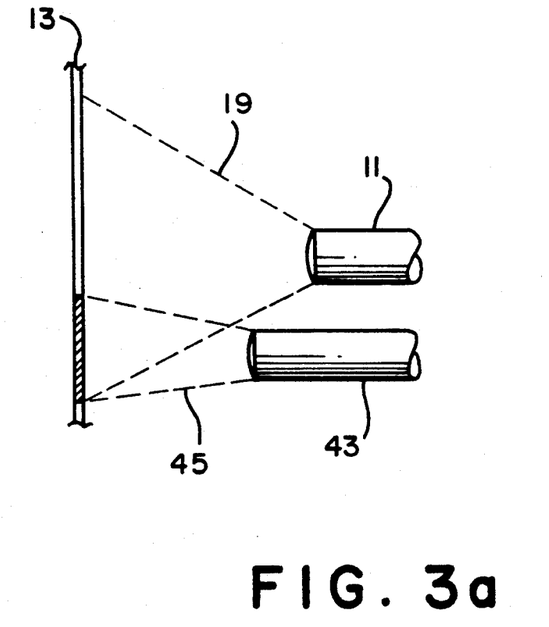
FIGS. 3a and 3b illustrate different fiber optic to sensor interface configurations.
Figure 3B:
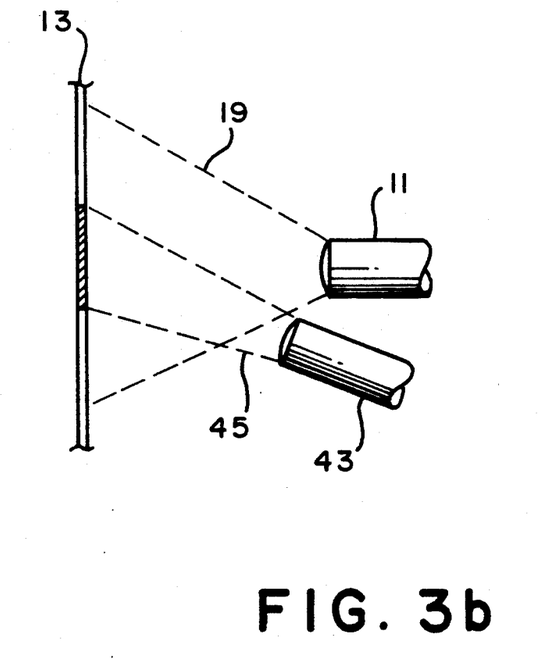

When a proper angle is chosen between the surface of LCD 17 and the incident light 19, the pulsating polarization of the LCD 17 results in a pulsating, reflected signal 45 which is carried by output fiber optic link 43 and detected by the photoreceiver 7. FIGS. 3a and 3b illustrate possible configurations of input fiber optic 11, light 19, interface 13, reflected light 45 and return fiber optic 43. FIG. 3a illustrates a side view of the interface 13 as depicted in FIG. 2a. FIG. 3b illustrates a side view of the interface 13 as depicted in FIG. 2b. To achieve a good dynamic range at comparatively small frequency deviations, a time duration method of measurement of the pulsating optical signal is preferable at the gauging system 3. Such methods of measurement are known in the prior art and form no part of the present invention.

The term contrast will be used to describe the magnitude of polarization and hence the reflectivity of LCD 17. The contrast is defined b the relation:

$$C = I_{MAX} \div I_{MIN}$$

where:

$I_{MAX}$ detected light signal corresponding to the maximum value of LCD reflectance; and $I_{MIN}$ is the detected light signal corresponding to the minimum value of LCD reflectance.

It is obvious that the contrast will depend on the angle formed between the axis of each fiber optic link I1 and 43, and the normal to the surface of the LCD 17. With fixed angles selected for optimum signal strength, the contrast will depend only on the magnitude of reflectance.

Figure 4:
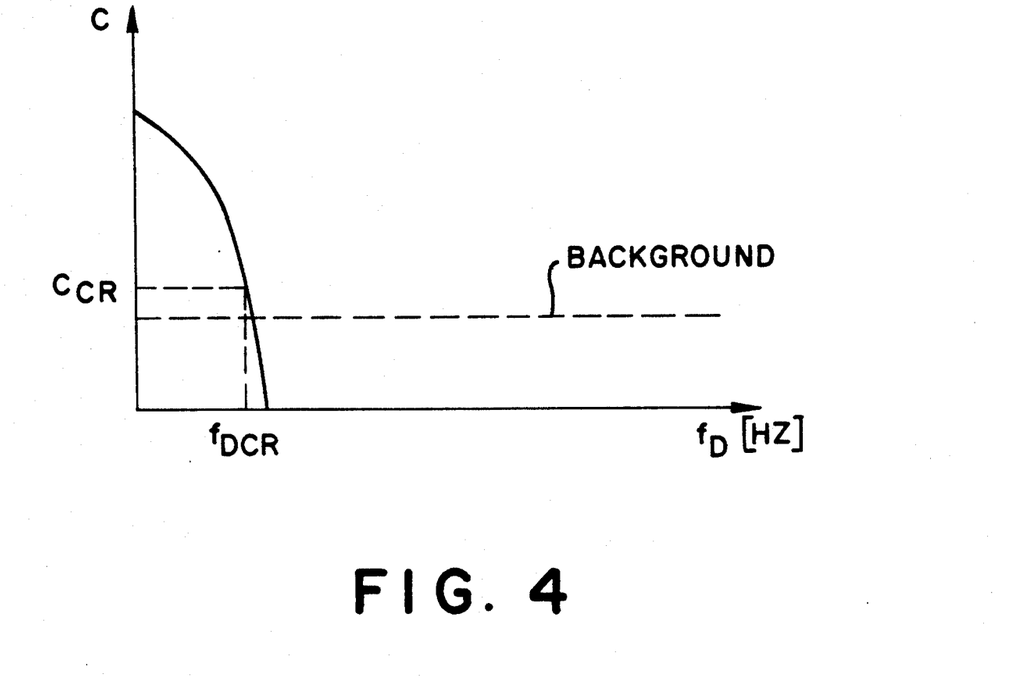
FIG. 4 illustrates the driving frequency versus contrast relationship of the LCD used in the present invention.
Figure 5:
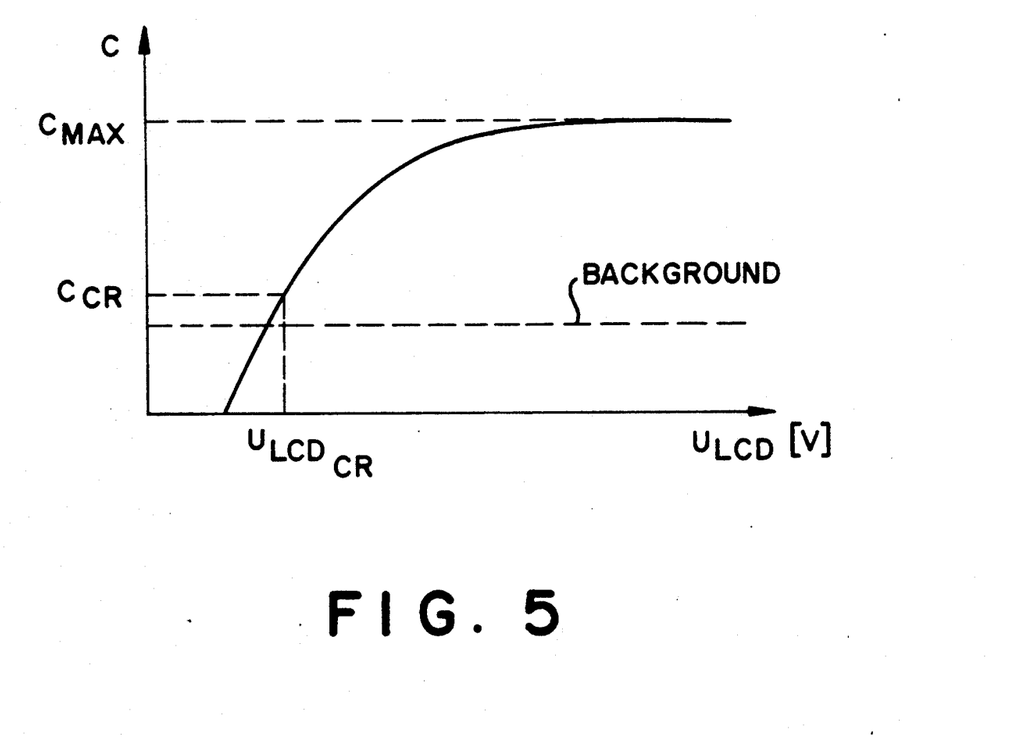
FIG. 5 illustrates the driving amplitude versus contrast relationship of the LCD used in the present invention.

The low frequency pulsation of the reflectance and therefore the changing contrast of the LCD 17 is caused by the change of the amplitude and frequency spectrum of the resultant applied electrical signal $U_{LCD}$. FIG. 4 graphically illustrates the LCD contrast as a function of the frequency of the resultant applied electrical signal $U_{LCD}$. As illustrated, increasing drive frequency results in decreased contrast. FIG. 5 graphically illustrates the LCD contrast as a function of the amplitude of the applied electrical signal $U_{LCD}$. As the amplitude of the resultant applied signal increases, the contrast increases to a maximum limit.

Figure 6:
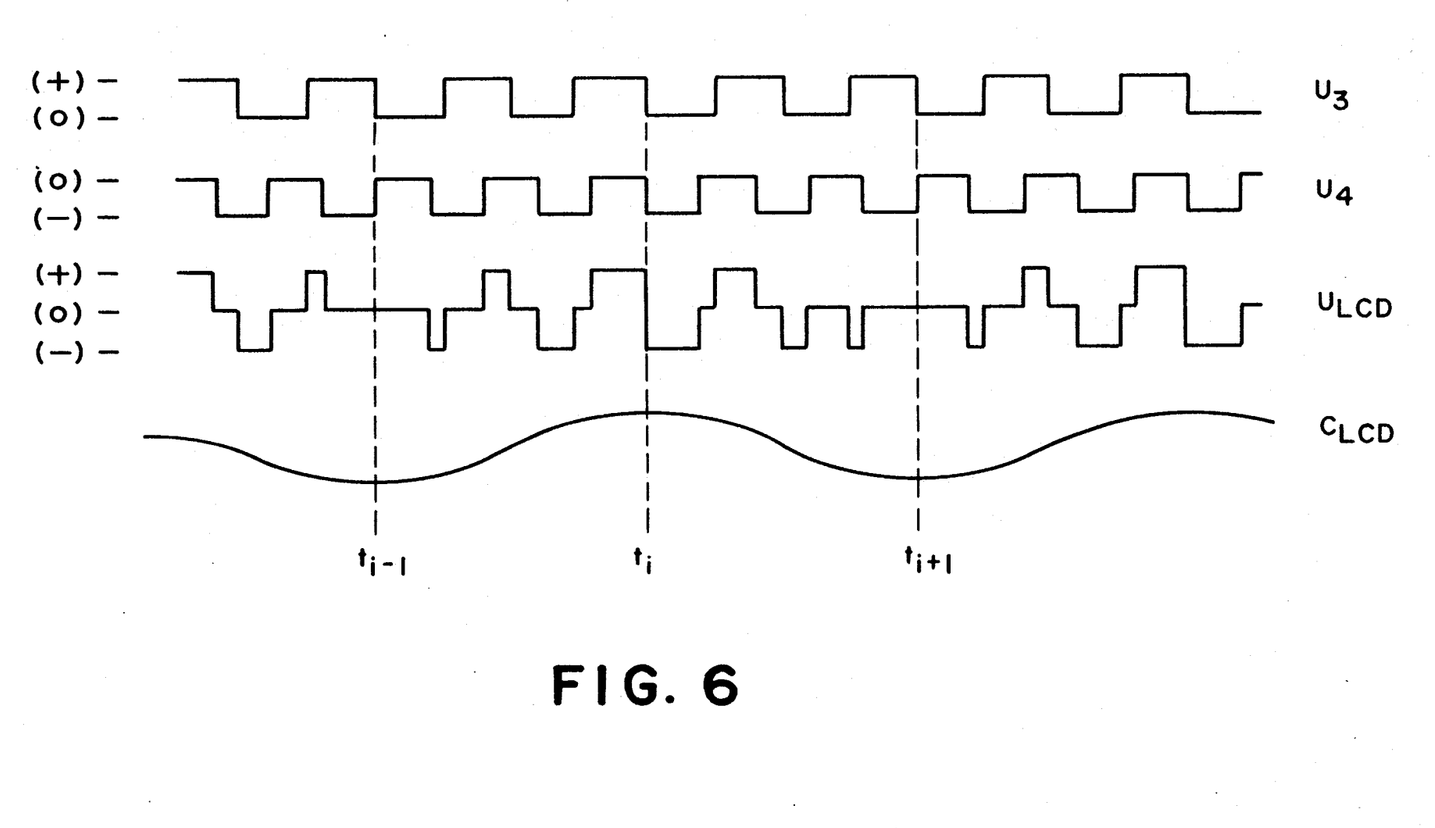
FIG. 6 illustrates various signal relationships of the subject invention.

The following abbreviations are used in FIGS. 4 and 5:

$C_{LCD}$ is the contrast of the LCD 17;

$C_{MAX}$ is the maximum value of the contrast;

$C_{cr}$ is the critical value of the contrast in which the detection of the pulsation is still possible $f_D$ is the drive frequency of the LCD 17;

$f_{Dcr}$ is the critical value of the drive frequency;

$U_{LCD}$ is the voltage signal applied to the LCD 17;

FIG. 6 illustrates the applied electrical signals $U_3$ and $U_4$, the resultant signal $U_{LCD}$ applied to the LCD 17 resulting from the algebraic sum of $U_3$ and $U_4$, and a representation of the contrast $C_{LCD}$ of LCD 17 due to the resultant applied signal $U_{LCD}$. $U_3$ is the voltage signal output of the first frequency divider 25 with angular frequency $\omega_3$ and amplitude U. $U_4$ is the voltage signal output of the second frequency divider 31 with angular frequency $\omega_4$ and amplitude U.

The value of the contrast between the points $t_i$ and $t_{i+1}$ will depend on two factors: the absolute value of the amplitude and the frequency spectrum of the resultant applied signal $U_{LCD}$. The relationship of those two factors to the contrast of LCD 17 is illustrated in FIGS. 4 and 5, as has been discussed. Typically, although $C_{LCD}$ is shown as a sinusoid in FIG. 6, the pulsations of the contrast need not be sinusoidal. For $t_i$, the amplitude of $U_{LCD}=2U$ and the contrast is at a maximum. For $t_{i+1}$, the amplitude of $U_{LCD}=0$ and the contrast is at a minimum.

Figure 7:
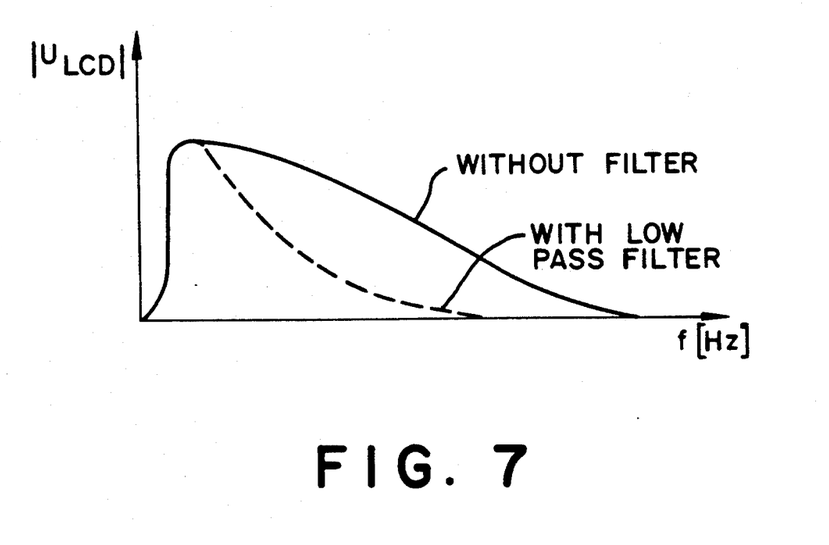
FIGS. 7 and 8 illustrate the approximate enveloping curve of the frequency spectrum of the applied signal on the LCD given that the phase difference between $U_3$ and $U_4$ is $\pi$ and $2\pi$, respectively; and, FIGS. 9(a-d), 10(a-d), 11(a-d) 12(a-d), and 13(a-d) illustrate signal to phase relationships of the present invention.
Figure 8:
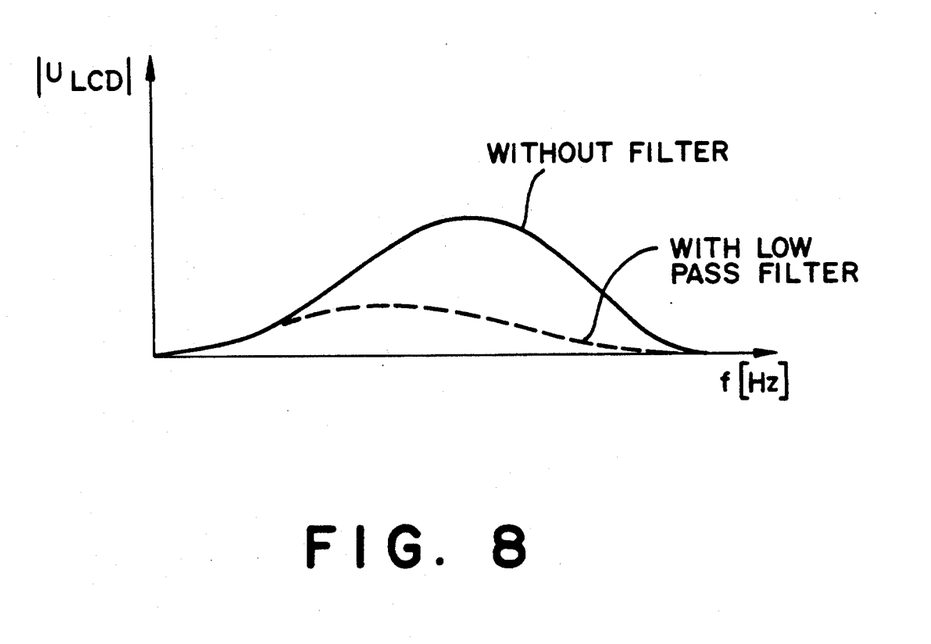
Figure 9A:
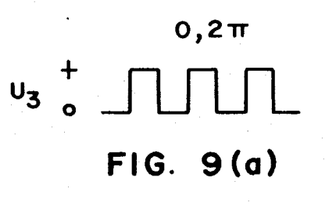
Figure 9B:
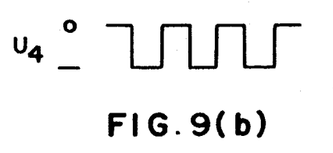
Figure 9C:
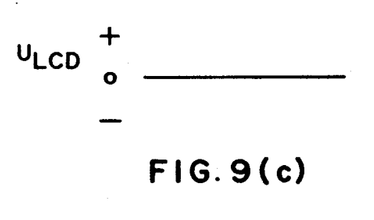
Figure 9D:
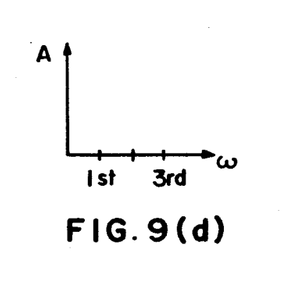
Figure 10A:
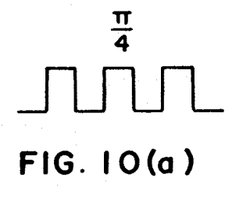
Figure 10B:
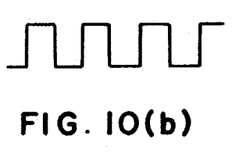
Figure 10C:
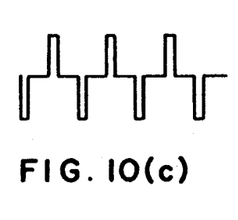
Figure 10D:
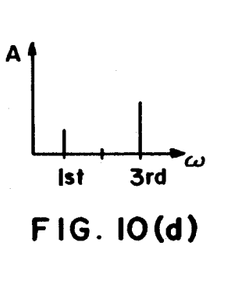
Figure 11A:
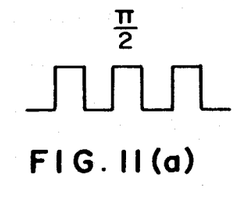
Figure 11B:
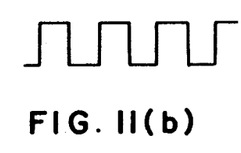
Figure 11C:
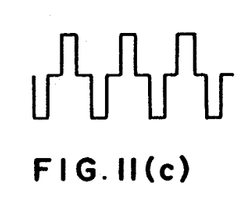
Figure 11D:
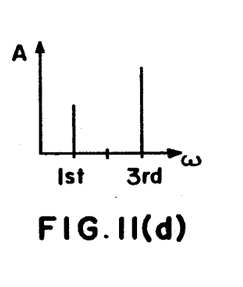

FIGS. 7 and 8 illustrate the approximate enveloping curve of the frequency spectrum of the applied resultant signal $U_{LCD}$ given that the phase difference between $U_3$ and $U_4$ is $\pi$ and $2\pi$, respectively. The solid line on both FIGS. 7 and 8 indicates curves corresponding to the case which discounts the inherent capacitance of the LCD 17. This capacitance in combination with high resistance circuitry will act like a low pass filter and will cause a useful suppression of high frequency harmonics. The dashed line on both FIGS. 7 and 8 indicates the situation when an actual low pass filter is connected serially with the LCD 17.

When detecting the optical signal at the gauging system 3, a threshold level corresponding to one half the maximum contrast value should be used.

FIGS. 9-13 illustrate how the phase relationship between signals $U_3$ and $U_4$ influences the resultant applied signal $U_{LCD}$. The signals $U_3$ and $U_4$, shown at (a) and (b), respectively, of each of the Figures, result in the signal $U_{LCD}$, shown at (c) in each of the Figures. A representation of low order harmonics from the frequency spectrums of the resultant applied signal $U_{LCD}$ at various $U_3$ and $U_4$ phase differences is shown at (d) in each of the Figures and includes first, second and third harmonic amplitudes. The Figures specifically illustrate the case in which the difference in frequency between $U_3$ and $U_4$ is very small.

Figure 12A:
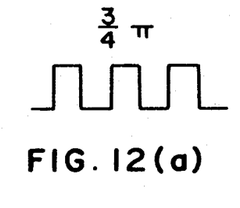
Figure 12B:
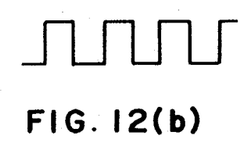
Figure 12C:
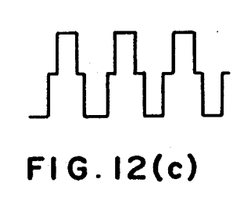
Figures 12C, 13:
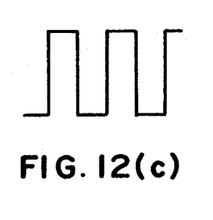
Figure 12D:
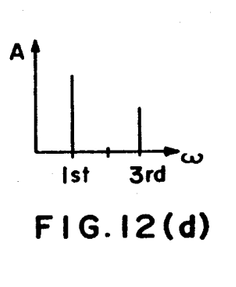
Figure 13A:
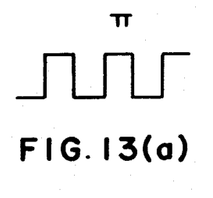
Figure 13B:
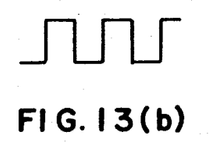
Figure 13D:
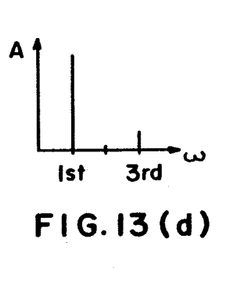

FIG. 9 illustrates the situation in which no phase difference exists between the signals $U_3$ and $U_4$, FIG. 10 a phase difference of $\pi/4$, FIG. 11 a phase difference of $\pi/2$, FIG 12 a phase difference of $3\pi/4$ and FIG. 13 a phase difference of $\pi$.

While the invention has been particularly shown and described with reference to a preferred embodiment thereof, it will be understood by those skilled in the art that numerous changes in form and detail may be made therein without departing from the spirit and scope of the invention as defined by the following claims.

What is claimed is:

1. An optoelectric sensor and converter comprising:
   a transducer means for generating a first, variable frequency output signal;
   a first frequency divider means for dividing said first output signal and generating a second, divided output signal;
   a frequency stabilized generator means for generating a third, stable frequency output signal;
   a second frequency divider means for dividing said third, stable frequency output signal and generating a fourth, periodic, constant frequency output signal;
   a photocell means for converting light radiation into electricity for powering said transducer means, said first frequency divider means, said frequency stabilized generator means and said second frequency divider means; and,
   a radiation modulating means driven by said second and fourth output signals.

2. The optoelectric sensor and converter of claim 1, wherein said photocell means and said radiation modulating means are both illuminated by a single source of radiation.

3. The optoelectric sensor and converter of claim 2, wherein said radiation modulating means reflects or transmits radiation from said single source of radiation, and is driven by a drive signal which is the algebraic sum of said second and fourth output signals.

4. The optoelectric sensor and converter of claim 3, wherein said radiation modulating means comprises a liquid crystal display.

5. The optoelectric sensor and converter of claim 3, wherein said radiation modulating means, in response to the drive signal, can be driven below, up to and over a cutoff frequency of said radiation modulating means.

* * * * *